Sept. 21, 1943.    P. SCHLUMBOHM    2,330,012
MIXER AND STRAINER
Filed Sept. 18, 1939
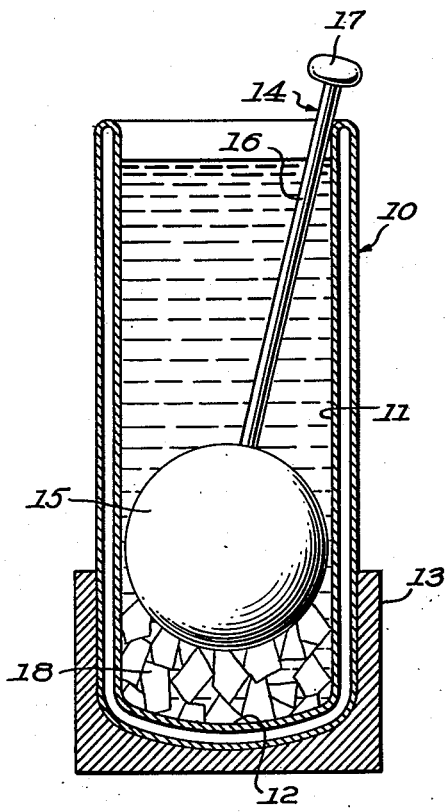
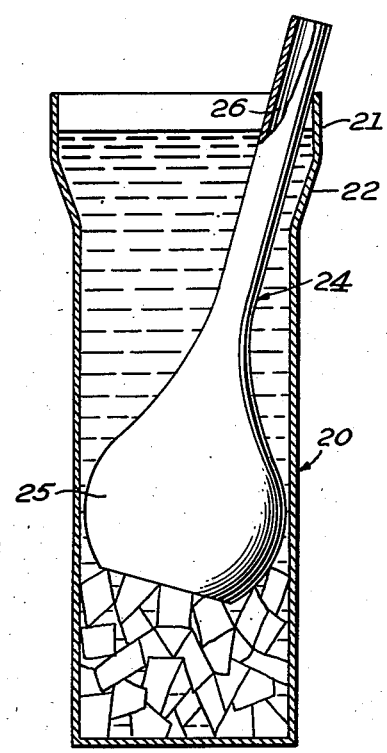
Inventor.

Patented Sept. 21, 1943

2,330,012

UNITED STATES PATENT OFFICE 2,330,012

MIXER AND STRAINER

Peter Schlumbohm, New York, N. Y.

Application September 18, 1939, Serial No. 295,429

7 Claims. (Cl. 210—149)

This invention relates to straining and mixing and more particularly to a device for mixing liquids and non-liquids and straining the liquids from the non-liquids.

Prior to the instant invention various devices have been utilized for the mixing of liquids, mixing of cocktails, cooling of cocktails, straining of cooled cocktails or juices from ice used as a cooling medium, and the cooling of bottled beverages, and among such prior devices are the mixer described in my prior U. S. Patent No. 2,075,831 and the bottle cooler described in my prior U. S. Patent No. 2,163,568. These prior devices differ from the instant invention and the differences involved in the present invention make for new results and advantages not inherent in the said prior devices as will be set forth in detail in this specification and the accompanying drawing.

As set forth in the disclosure of my two prior patents, a plunger element is adapted to be reciprocated or moved up or down within an outer container of uniform circular cross section having a diameter which is slightly larger than the diameter of the plunger element. The plunger displaces liquid from one section of the container into another while forcing the liquid through the narrow annular passage between the plunger and the wall of the container. Though the annular passage between the plunger and the wall of the container produces some strainer effect when the relative dimensions of the two elements are properly related as, for example, in the disclosure of my U. S. Patent No. 2,163,568 (see page 2, line 33), ice is trapped underneath the bottle-plunger in the bottom chamber of the bottle cooler, the plunger in these patents was of cylindrical configuration to cooperate with the cylindrical plunger-chamber to form an annular jet of cylindrical shape and of considerable length so as to produce the optimal mixing effect in connection with the liquid to be mixed.

In accordance with the instant invention the shape of the plunger is changed, so while perhaps sacrificing some but not all of the mixing effect, the strainer effect is greatly improved.

It is an object of the invention to provide a novel mixer and strainer device involving a container and a combined mixer and strainer of novel configuration which cooperates with the container in a novel manner to produce a mixing effect and a very efficient straining effect.

Other objects and the nature and advantages of the invention will be apparent from the following description taken in conjunction with the accompanying drawing, wherein:

Figure 1 is a vertical section of one form of device in accordance with the invention;

Figure 2 is a view similar to Fig. 1 but of a somewhat modified form of the invention.

Referring to Figure 1, the vacuum jar 10 comprises a cylindrical inner wall 11 and a bottom wall 12. The bottom of the vacuum jar 10 may be held within an insulated cup shaped holding member 13 in order to facilitate handling. The specific construction of the insulated holding member 13, however, forms no part of the instant invention.

Within the vacuum jar 10, the plunger element 14 may comprise a plunger head 15, a plunger rod 16 and a plunger handle 17. For all practical purposes, the plunger head may be in the shape of a sphere or in the shape approaching a sphere, such as a pear-shape or an egg-shape. It is to be understood that in this specification and in the claims which append same, when the expression "approaching the shape of a sphere" is used, shapes generic to pear shapes, egg shapes, as well as spherical shapes, are denoted.

It is to be clearly understood that the plunger head 15 is specifically different from a cylindrical shaped plunger wherein the space between the plunger head and the inner cylindrical wall of the container 10 is uniform with respect to the axis of the container. In accordance with the invention, the space between the plunger head 15 and the wall 11 approaches line contact in a plane substantially normal to the axis of the container 10 and approaches point contact in a plane through the axis of the container 10. In contradistinction, were the plunger element in the shape of a cylinder, the plunger head would approach plane contact entirely about the exterior of the plunger and would approach line contact through the axis of the container.

It is to be understood that in accordance with the invention, only line contact is approached in a plane perpendicular to the axis of the container 10 independently of the angle at which the plunger rod is held. This greatly facilitates the practical use of the device especially when pouring liquid from the container 10 into a glass while holding back the solid components 18 which may be ice. Even if the device tends to clog up, the passage of the liquid can be readily freed by wiggling the plunger rod 14 and thus "rolling" the plunger head 15. It is only with the plunger head 15 as described above that the apparatus can be operated with a relatively small difference of dimensions between the inner diameter of the cylindrical container 10 and the diameter of the plunger head 15. I have experimented with a cylinder of 99 mm. inside diameter and a plunger head of 97 mm. outside diameter and I have found that a dimension corresponding to a 1 mm. annular jet is sufficient to strain the tea leaves from hot tea brewed in the cylinder, or to strain lemon seeds from a cocktail mixture. Such small jet dimensions do not allow great tolerances in the manufacturing of the container and of the plunger. It is advisable to manufacture the plunger as a molded product and to produce the precise cylindrical wall of the container by means of a mandrel process or an extrusion process.

The plunger should have no buoyancy in water and on the other hand should not be unduly heavy. The surface of the plunger may be roughened in "blackberry" style. I have found plastics, such as "Bakelite" and glass, to be preferred as suitable materials for the making of the plunger, but one need not restrict himself to these materials for other materials may be used. The plunger may be hollow.

Due to the small dimensions of the annular jet, the liquid has a brake effect on the movement of the plunger and this protects the bottom of the container against the impact of the plunger. This is important when the container comprises a glass vacuum jar as shown in Figure 1.

The novel element 14 greatly simplifies the application of a vacuum jar to the purpose of mixing cocktails. If present vacuum jars are used as cocktail shakers, an interior protective wall must be provided to keep the ice from smashing the inner glass wall. In addition a water tight lid and a strainer, both of metal, requiring additional costly mounting of the glass jar would have to be provided. These additions are eliminated by my novel construction involving simply a container and a novel plunger element associated therewith in a novel manner which produces a mixing effect and a novel straining effect.

In operating the device, the liquids and solids are introduced into the container before the plunger is inserted. In view of the considerable volume of displacement of the plunger head 15, a filling mark must be provided if a straight cylinder is used for the container, as otherwise the liquid might overflow upon insertion of the plunger. For this reason, the container 20, shown in Fig. 2, may be considered to be more practical. The upper part 21 is widened to take up the volume of displaced liquid and the user would fill the container 20 only up to the shoulder 22. A container 20 as shown in Fig. 2 may be manufactured with great precision out of aluminum by the extrusion process. The plunger 24 in Fig. 2 may comprise a plunger head 25 which may be said to approach spherical shape, and an integral handle 26.

It will be obvious to those skilled in the art that various changes may be made in this device without departing from the spirit of the invention and therefore the invention is not limited to what is shown in the drawing and described in the specification but only as indicated in the appended claims.

What is claimed is:

1. A device for mixing and straining a mixture of liquid and solid components, comprising: a generally cylindrical container having a wall closing one end, a combined mixer and strainer element comprising a handle and a plunger head, said plunger head being imperforate and having a shape approaching that of a sphere whose largest diameter approaches the interior diameter of said cylindrical container, the largest diameter of said plunger head being smaller in dimension than the interior diameter of said cylindrical container but being almost as large as the interior diameter of said cylindrical container whereby the plunger head may cooperate with the walls of the container to perform straining action as required.

2. The structure recited in claim 1, said plunger head being spherical in shape.

3. A device for mixing and straining a mixture of liquid and solid components, comprising: an elongated container having relatively long side walls and a wall closing the container at one end, a combined mixer and strainer element located in the interior of said container, said element having a handle projecting toward the open end of said container, an imperforate plunger head connected to the handle and located in the interior of said container, said plunger head having a cross sectional shape approaching the corresponding cross sectional shape of said container, the cross sectional shape of said container being uniform throughout a substantial portion thereof in a direction corresponding to the axis of said container, the cross sectional dimension of said plunger head being non-uniform along the axis of the element and being greatest in size intermediate the top and bottom of said head and gradually diminishing in size as the top and bottom of said head are approached, the largest linear dimension in any section of the plunger head being smaller than the corresponding linear dimension of the corresponding section through the container but being almost as large whereby the plunger head may cooperate with the walls of the container to perform straining action as required.

4. The structure recited in claim 1, said plunger element being of greater specific gravity than water.

5. The structure recited in claim 1, said container being a vacuum jar made of glass, and the horizontal sectional area of the plunger head being sufficiently large with respect to the interior cross sectional area of the container so that liquid pumped by said plunger head will have a brake effect on the movement of the plunger head so as to protect the glass wall of said vacuum jar against the impact of said plunger.

6. A device for mixing and straining a mixture of liquid and solid components, comprising: a container having elongated side walls and a wall closing the bottom thereof, a mixing and straining element located within said container comprising a handle and a head, said handle being of relatively small cross sectional dimension as compared with said head, said head being imperforate and having a relatively large three dimensional surface and having a cross sectional area approaching that of the interior of said container, said handle being tiltable within said container, said cross sectional area of said head, when tilted in a plane normal to the vertical axis of said container, being almost as large as the corresponding cross sectional area of said container but being somewhat smaller than same so that the plunger head may cooperate with the walls of the container to perform straining action.

7. A device for mixing and straining a mixture of liquid and solid components, comprising: a cylindrical container having a closed bottom and an open top, a mixing and straining element comprising a generally spherical plunger head and a rod-like handle connected thereto, the cross sectional dimension of said handle being less than the diameter of the generally spherical head, the diameter of said generally spherical head approaching the interior diameter of the container, the difference between the diameter of the cylindrical container and the diameter of the generally spherical head being relatively small so that the spherical head may act both as a plunger for mixing media within the container and as a strainer in cooperation with the walls of the container for separating liquid media from solid media.

PETER SCHLUMBOHM.